(12) United States Patent
Han et al.

(10) Patent No.: US 11,789,272 B2
(45) Date of Patent: Oct. 17, 2023

(54) NEAR-TO-EYE DISPLAY DEVICE

(71) Applicants: Beijing BOE Optoelectronics Technology Co., Ltd., Beijing (CN); BOE Technology Group Co., Ltd., Beijing (CN)

(72) Inventors: Na Han, Beijing (CN); Chenru Wang, Beijing (CN); Ruijun Dong, Beijing (CN); Yulong Wu, Beijing (CN); Ke Li, Beijing (CN); Jiarong Bai, Beijing (CN); Hao Zhang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 294 days.

(21) Appl. No.: 17/405,952

(22) Filed: Aug. 18, 2021

(65) Prior Publication Data
US 2022/0075193 A1    Mar. 10, 2022

(30) Foreign Application Priority Data

Sep. 9, 2020   (CN) .......................... 202010942943.1

(51) Int. Cl.
*G02B 27/01*      (2006.01)
*G02B 27/14*      (2006.01)

(52) U.S. Cl.
CPC ....... *G02B 27/0172* (2013.01); *G02B 27/145* (2013.01)

(58) Field of Classification Search
CPC .................................................. G02B 27/172
See application file for complete search history.

(56) References Cited

U.S. PATENT DOCUMENTS

2014/0118813 A1*  5/2014  Amitai ................. G02F 1/0136
                                          359/489.08

FOREIGN PATENT DOCUMENTS

| CN | 107305291 A | 10/2017 |
|----|-------------|---------|
| CN | 108873355 A | 11/2018 |
| CN | 110927969 A | 3/2020  |

OTHER PUBLICATIONS

CN202010942943.1 first office action.

* cited by examiner

*Primary Examiner* — Edmond C Lau
(74) *Attorney, Agent, or Firm* — IPRO, PLLC

(57) ABSTRACT

The disclosure discloses a near-to-eye display device, including: a first display screen, a first imaging lens, a second display screen, a second imaging lens and a waveguide. The first display screen provides a first image and the first image enters the waveguide through the first imaging lens. The second display screen provides a second image, the second image enters the waveguide through the second imaging lens. Imaging light rays from the first imaging lens and the second imaging lens can emit towards a light-emitting surface of the waveguide via a light taking part, and enter the human eyes.

16 Claims, 3 Drawing Sheets

NEAR-TO-EYE DISPLAY DEVICE

CROSS REFERENCE TO RELATED APPLICATIONS

This application is based on and claims priority under 35 U.S.C 119 to Chinese Patent Application No. 202010942943.1, filed on Sep. 9, 2020, in the China National Intellectual Property Administration. The entire disclosure of the above application is incorporated herein by reference.

FIELD

The disclosure relates to the technical field of display, in particular to a near-to-eye display device.

BACKGROUND

Near-to-eye display, such as virtual reality (VR) helmet and augmented reality (AR) intelligent glasses, is a hot research topic at present. The near-to-eye display provides people with more real interactive experience, thus is widely used in the fields of telemedicine, industrial design, education, military virtual training, entertainment and the like.

The VR technology presents a totally enclosed virtual environment, while AR technology provides an interactive experience of a real-world environment where the objects that reside in the real world are enhanced by computer-generated perceptual information, both of which have been widely used.

In the currently used VR/AR display, a focal length of a display image is fixed, thus both a near-view image and a long-view image are located at the same image plane. However, a dizziness phenomenon due to visual fatigue often occurs since the human eyes focus at the same position for a long time.

SUMMARY

An embodiment of the disclosure provides a near-to-eye display device. The near-to-eye display device includes: a first display screen, a second display screen, a first imaging lens, a second imaging lens and a waveguide. The first display screen is configured to display a first image, and the second display screen is configured to display a second image. The first imaging lens is located at a light-emitting side of the first display screen and configured to image the first image. The second imaging lens is located at a light-emitting side of the second display screen and configured to image the second image. Image distances of the first imaging lens and the second imaging lens are different. The waveguide is located on optical paths of the first imaging lens and the second imaging lens and configured to guide imaging light rays through the first imaging lens and imaging light rays through the second imaging lens. The waveguide includes: a first light incident surface; a second light incident surface; a light-emitting surface; and a light taking part in the waveguide. The first light incident surface is configured to receive the imaging light rays through the first imaging lens. The second light incident surface is configured to receive the imaging light rays through the second imaging lens. The light taking part is configured to reflect the imaging light rays guided in the waveguide towards the light-emitting surface. The light-emitting surface is configured to allow the imaging light rays to go towards human eyes.

BRIEF DESCRIPTION OF THE DRAWINGS

In order to explain technical solutions of embodiments of the disclosure more clearly, the drawings that need to be used in the embodiments of the disclosure will be briefly introduced below. Apparently, the drawings introduced below are only some embodiments of the disclosure, and for those of ordinary skill in the art, on the premise of no creative labor, other drawings can also be obtained according to these drawings.

Figure 1:
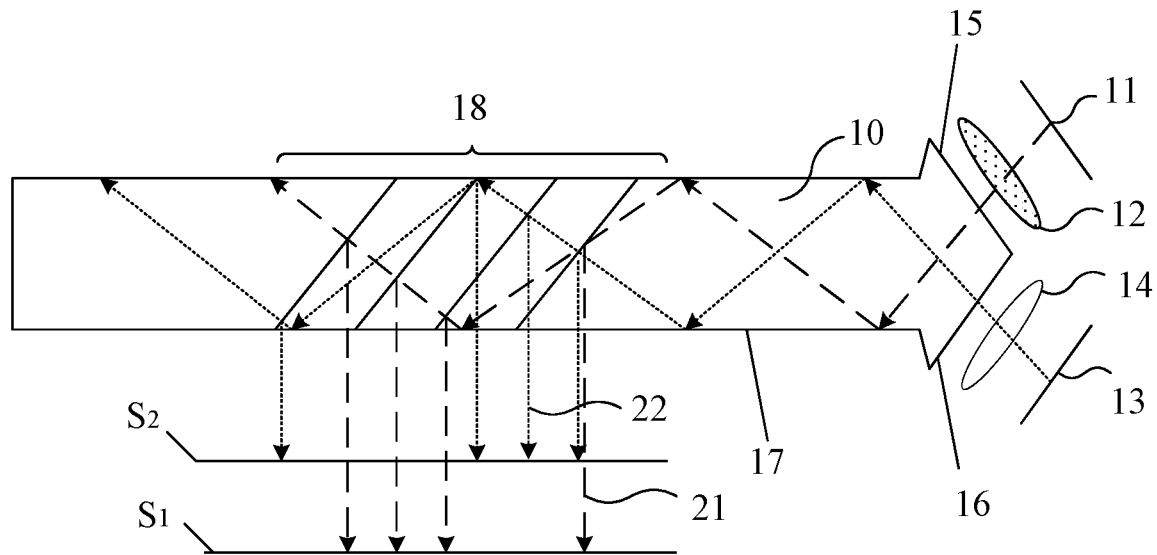
FIG. 1 is a first cross-sectional view of a near-to-eye display device according to some embodiments of the disclosure.

Where:
10—waveguide, 11—first display screen, 12—first imaging lens, 13—second display screen, 14—second imaging lens, 15—first light incident surface, 16—second light incident surface, 17—light-emitting surface, 18—light taking part, 19—back surface, 20—symmetry surface, 21—first light ray, 22—second light ray, 101—first transflective layer, 102—second transflective layer, 103—third transflective layer, 104—fourth transflective layer, 105—fifth transflective layer, 106—sixth transflective layer, $S_1$-first image plane, and $S_2$-second image plane.

DETAILED DESCRIPTION OF THE EMBODIMENTS

In order to make the above objects, features and advantages of the disclosure more obvious and easy to understand, the disclosure will be further described below in combination with the accompanying drawings and embodiments. However, example implementations can be implemented in a variety of forms and should not be construed as being limited to the implementations set forth herein; on the contrary, providing these implementations makes the disclosure more comprehensive and complete, and comprehensively communicates the concept of the example implementations to those skilled in the art. In the figures, the same reference numerals represent the same or similar structures, so their repeated description will be omitted. The words expressing positions and directions described in the disclosure are explained by taking the accompanying drawings as an example, but they can also be changed as needed, and all the changes are included in the scope of protection of the disclosure. The accompanying drawings of the disclosure are used to illustrate the relative positional relationship and do not represent the true scale.

A near-to-eye display device is a display device worn on eyes of a user, for example, the near-to-eye display device is usually in a form of glasses or a helmet. The near-to-eye display device may provide the user with augmented reality (AR) and virtual reality (VR) experience. By the AR near-to-eye display technology, a real-world environment where the objects that reside in the real world are enhanced by computer-generated perceptual information, so that the user can see a final augmented real-scene image from a screen. The VR near-to-eye display technology displays images for left and right eyes respectively on near-to-eye displays corresponding to the left and right eyes. After the left and right eyes obtain image information with differences, stereo vision may be synthesized in the brain.

A near-to-eye display device provided by the embodiment of the disclosure accords with the situation that human eyes watch a real scene, and may eliminate the dizziness problem caused by long-term focusing of the human eyes at the same position.

The near-to-eye display device provided by a specific embodiment of the disclosure will now be described in detail with reference to the accompanying drawings.

FIG. 1 is a first cross-sectional view of a near-to-eye display device according to some embodiments of the disclosure.

Referring to FIG. 1, the near-to-eye display device provided by the embodiment of the disclosure includes:

a first display screen 11 configured to display a first image;

a first imaging lens 12 located at a light-emitting side of the first display screen and configured to image the first image;

a second display screen 13 configured to display a second image;

a second imaging lens 14 located at a light-emitting side of the second display screen and configured to image the second image; and a waveguide 10 located on optical paths of the first imaging lens and the second imaging lens and configured to guide imaging light rays from the first imaging lens and the second imaging lens.

Image distances of the first imaging lens 12 and the second imaging lens 14 are different, as shown in FIG. 1, a first light ray 21 is from the first display screen 11, and a second light ray 22 is from the second display screen 13. A first image plane $S_1$ is an image plane of the first image, and a second image plane $S_2$ is an image plane of the second image.

As shown in FIG. 1, the waveguide 10 includes: a first light incident surface 15, a second light incident surface 16, a light-emitting surface 17 and a light taking part 18 in the waveguide. The first light incident surface 15 is configured to receive the imaging light ray from the first imaging lens 12. The second light incident surface 16 is configured to receive the imaging light ray from the second imaging lens 14. The light taking part 18 is configured to reflect the imaging light rays guided by the waveguide 10 towards the light-emitting surface 17. The light-emitting surface 17 is configured to allow the imaging light rays to go towards human eyes.

The first display screen 11 in the near-to-eye display device provided by the embodiment of the disclosure is configured to display the first image, and the second display screen 13 is configured to display the second image. Content of the first image is different from that of the second image, for example, the first image may be a foreground image, and the second image may be a background image; or, the first image may be a background image and the second image may be a foreground image, which is not limited herein. The first imaging lens 12 is used for the first image, and the second imaging lens 14 is used for the second image. The image distances of the first imaging lens 12 and the second imaging lens 14 are made to be different by setting object distances and focal lengths of the first imaging lens 12 and the second imaging lens 14, so that the first image plane $S_1$ and the second image plane $S_2$ as shown in FIG. 1 are generated. As can be seen from FIG. 1, the first image plane $S_1$ and the second image plane $S_2$ are at different distances from the human eyes, so that two images are displayed on two different image planes. As such, the viewer may see two different displayed images. Through the eye adjustment, when the image of the first image plane $S_1$ is focused on, the image of the second image plane $S_2$ is blurry for the human eyes, and when the image of the second image plane $S_2$ is focused on, the image of the first image plane $S_1$ is blurry for the human eyes. Such experience is consistent with a feeling that viewer watches an actual scene. Therefore, the dizziness phenomenon caused by fatigue due to long-time watching and long-time focusing of the human eyes at the same position may be eliminated.

In some embodiments, as shown in FIG. 1, since the first image plane $S_1$ is closer, than the second image plane $S_2$, to the human eyes, the foreground image may be displayed on the first image plane $S_1$, the background image may be displayed on the second image plane $S_2$. As such, the purpose of optimizing a display effect may be achieved by controlling the first display screen 11 and the second display screen 13 to display the corresponding images.

That the image distances of the first imaging lens 12 and the second imaging lens 13 are different may be implemented in two ways in the embodiment of the disclosure.

In some embodiments of the disclosure, as shown in FIG. 1, the distance between the first imaging lens 12 and the first display screen 11, and the distance between the second imaging lens 14 and the second display screen 13 are the same. While the focal lengths of the first imaging lens 12 and the second imaging lens 14 are different. Accordingly, the image distances of the two imaging lenses are different, so that two different images are displayed on the two image planes.

As shown in FIG. 1, in a case that the object distances of the first imaging lens 12 and the second imaging lens 14 are equal, the image distances are related to the focal lengths, and the larger the focal lengths are, the larger the image distances are. Therefore, the two images may be imaged at different image distances by adjusting the first imaging lens 12 and the second imaging lens 14 to have different focal lengths.

Taking the near-to-eye display device shown in FIG. 1 as an example, a distance from the first display screen 11 to the first imaging lens 12 is equal to a distance from the second display screen 13 to the second imaging lens 14. While a focal length of the first imaging lens 12 is larger than that of the second imaging lens 14. As such, the first image is imaged on a plane farther than that of the second image. Therefore, the first image plane $S_1$ of the first imaging lens 12 is closer, than the second image plane $S_2$ of the second imaging lens 14, to the human eyes and is configured to display the foreground image; while the second image plane $S_2$ of the second imaging lens 14 is configured to display the background image.

Figure 2:
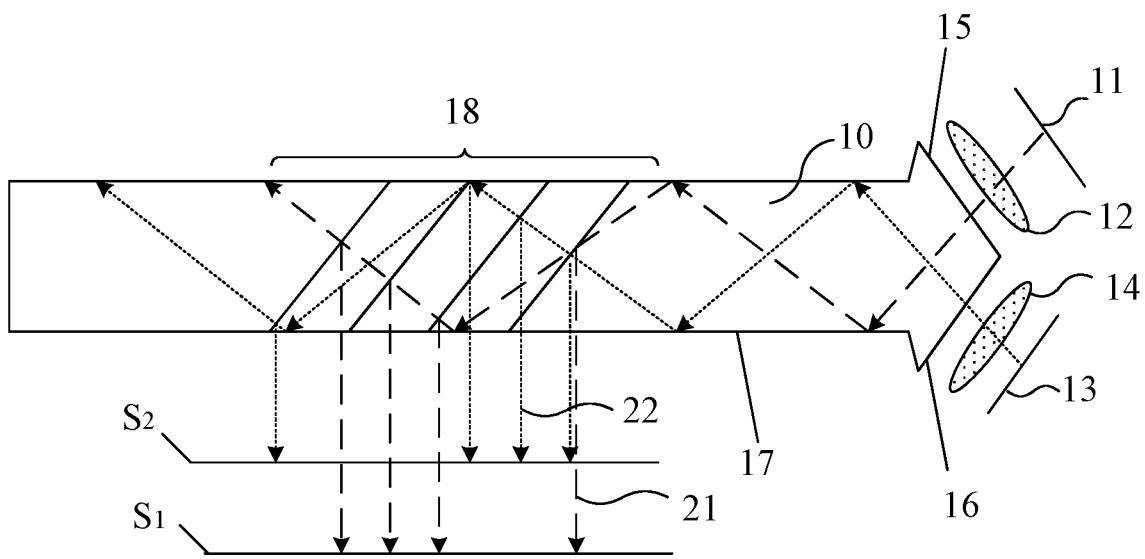
FIG. 2 is a second cross-sectional view of a near-to-eye display device according to some embodiments of the disclosure.

FIG. 2 is a second cross-sectional view of a near-to-eye display device according to some embodiments of the disclosure.

Referring to FIG. 2, in some embodiments of the disclosure, focal lengths of the first imaging lens 12 and the second imaging lens 14 are the same, while the distance between the first imaging lens 12 and the first display screen 11 and the distance between the second imaging lens 14 and the second display screen 13 are different. Accordingly, image distances of the two imaging lenses are different, so that two different images can be seen on the two image planes.

As shown in FIG. 2, in a case that the focal lengths of the first imaging lens 12 and the second imaging lens 14 are equal, the image distances are related to object distances. The larger the object distances are, the larger the image distances are, and the smaller the object distances are, the smaller the image distances are, so that the two images may be imaged at different image distances by adjusting the object distances of the first imaging lens 12 and the second imaging lens 14.

Taking the near-to-eye display device shown in FIG. 2 as an example, the focal lengths of the first imaging lens 12 and the second imaging lens 14 are equal. While the distance from the first display screen 11 to the first imaging lens 12 is greater than the distance from the second display screen 13 to the second imaging lens 14. That is, the object distance of the first imaging lens 12 is greater than the object distance of the second imaging lens 14. Therefore, the image distance of the first imaging lens 12 is larger than the image distance of the second imaging lens 14. As such, the first image plane $S_1$ of the first imaging lens 12 is closer, than the second image plane $S_2$ of the second imaging lens 14, to the human eyes and is configured to display the foreground image, while the second image plane $S_2$ of the second imaging lens 14 is configured to display the background image.

Further, in the embodiment of the disclosure, the distance from the first display screen 11 to the first imaging lens 12 is smaller than the focal length of the first imaging lens 12; and the distance from the second display screen 13 to the second imaging lens 14 is smaller than the focal length of the second imaging lens 14. As such, when the object distances are within one focal length, a vertical and amplified virtual image is obtained.

Figure 3:
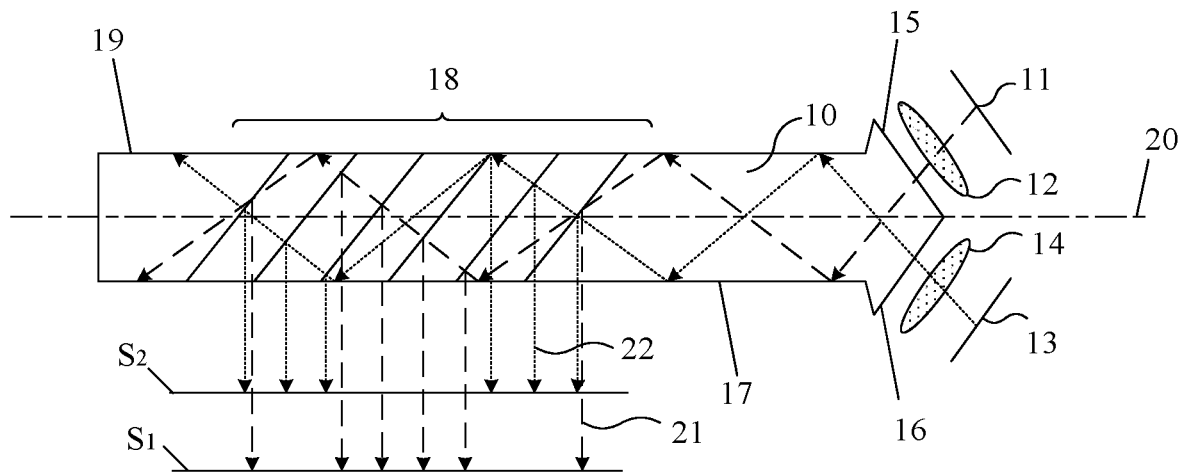
FIG. 3 is a third cross-sectional view of a near-to-eye display device according to some embodiments of the disclosure.

FIG. 3 is a third cross-sectional view of a near-to-eye display device according to some embodiments of the disclosure.

Referring to FIG. 3, in the embodiment provided by the disclosure, the waveguide 10 further includes: a back surface 19 and a symmetry surface 20.

The back surface 19 is disposed opposite to the light-emitting surface 17. The symmetry surface 20 is located in a middle of the light-emitting surface and the back surface and is parallel to the light-emitting surface 17 and the back surface 19. The first light incident surface 15 is located at one end of the back surface 19 and forms an included angle with the back surface 19. The second light incident surface 16 is located at one end of the light-emitting surface 17 and forms a included angle with the light-emitting surface. The first light incident surface 15 and the second light incident surface 16 are in mirror symmetry with respect to the symmetry surface 20 of the waveguide 10, and the back surface 19 and the light-emitting surface 17 are in mirror symmetry.

By designing the waveguide 10 with an axisymmetric structure, when sizes of field angles of the first display screen 11 and the second display screen 13 are consistent and symmetrically arranged, the sizes of the field angles of images on the two image planes are consistent. As such, the images displayed on the image planes are symmetrical, so that the human eyes are in a comfortable state when observing.

In some embodiments, the included angle between the first light incident surface 15 and the back surface 19 may be set to be 40°-60°, and the included angle between the second light incident surface 16 and the light-emitting surface 17 may be set to be 40°-60°. In some embodiments, the light rays passing through the imaging lenses have a certain divergence angle. The first light incident surface 15 and the second light incident surface 16 are obliquely disposed, so that the light rays may all have an angle of incidence greater than a critical angle when being incident on the waveguide 10 so as to satisfy a total reflection condition to be conducted in the waveguide 10.

Figure 4:
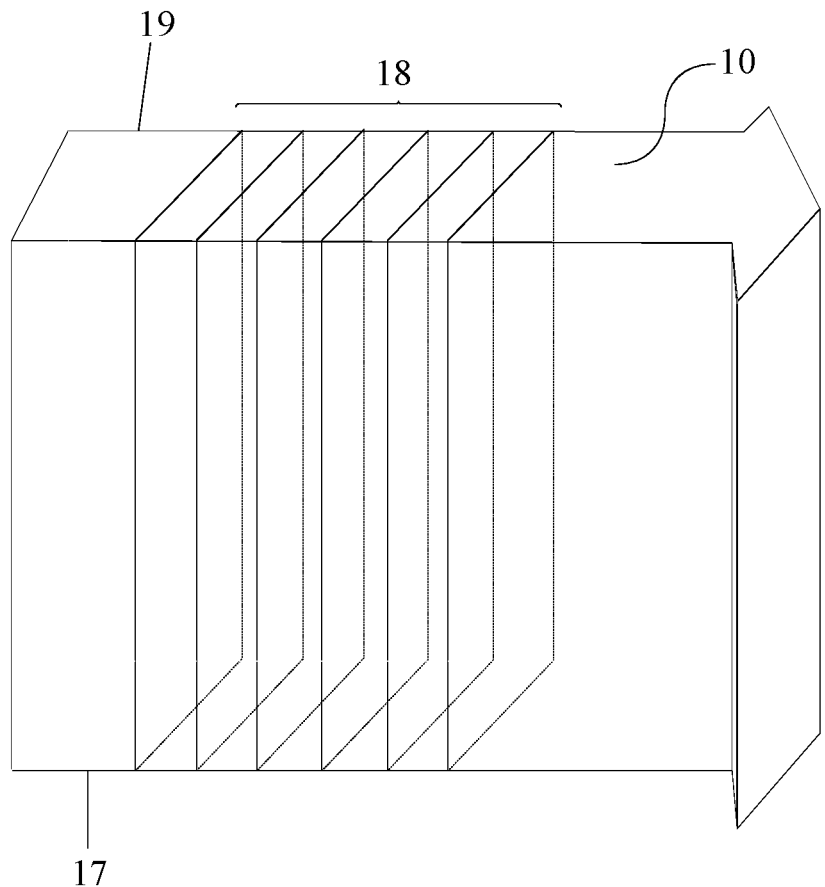
FIG. 4 is a three-dimensional schematic structural diagram of a waveguide according to some embodiments of the disclosure.

FIG. 4 is a three-dimensional schematic structural diagram of a waveguide according to some embodiments of the disclosure.

Referring to FIG. 4, the light taking part 18 includes a plurality of transflective layers. The transflective layers are located between the light-emitting surface 17 and the back surface 19 and form a included angle with the light-emitting surface 17. The transflective layers are configured to allow a part of the imaging light rays to pass through the transflective layers and reflect a part of the imaging light rays towards the light-emitting surface.

In some embodiments, when the imaging light rays are incident on a first transflective layer, some of the light rays will pass through the first transflective layer so as to continue to propagate along the waveguide 10 to a next transflective layer, and other parts of the light rays will be reflected by the transflective layers. By providing the transflective layers with a suitable inclination angle, the reflected light rays may be vertically incident on the light-emitting surface 17 so as to be emitted to the human eyes. Each transflective layer in the waveguide has the same effect, so that the arrangement of the plurality of transflective layers may enable the emergent light rays to have a certain width, and pupil expansion effect for the first image and the second image is achieved.

Through the above analysis, it can be seen that the larger the number of the transflective layers is, the greater the pupil expansion effect is, and the smaller the number of the transflective layers is, the weaker the pupil expansion effect is. In some embodiments, an appropriate number of transflective layers may be provided depending on a length of the waveguide 10 to adapt to application scenarios for different people.

In practical applications, the total length of the waveguide 10 ranges from 10 cm to 20 cm, covering interpupillary distances of different populations, and accordingly, the number of the transflective layers may range from 2 to 10.

In the embodiment of the disclosure, the plurality of transflective layers are distributed in parallel and at equal intervals. Proper intervals are disposed between the transflective layers, so that it is ensured that the imaging light rays are incident on the next transflective layer when penetrating through the current transflective layer, the imaging light rays are continuous, and the phenomenon that a picture is disconnected is prevented. A certain inclination angle is provided between the transflective layers and the light-emitting surface, so that it is ensured that the light rays reflected by the transflective layers are emitted to the light-emitting surface vertically.

In some embodiments, the included angle between each transflective layer and the light-emitting surface may be set to be 20°-30°.

In the embodiment of the disclosure, reflectivity R of each of the transflective layers increases along with increase of a distance between the transflective layers and the first light incident surface 15. Some of the imaging light rays passing through the transflective layers will continue to propagate along the waveguide 10 towards the next transflective layer, and some parts of the light rays are reflected perpendicular to the light-emitting surface 17 to enter the human eyes. In order to ensure the light rays reflected by the transflective layers to human eyes to be distributed uniformly, the reflectivity R of the transflective layers should be increased along with increase of the distance between the transflective layers and the first light incident surface 15. As such, the reflected light rays emitted toward the light-emitting surface 17 are uniformly distributed, and thus the emitted light rays entering the human eyes are uniformly distributed.

If the reflectivity of the transflective layers sequentially is $R_1$ to $R_n$ in a direction of increase of the distance between the transflective layers and the first light incident surface 15, the reflectivities of the respective transflective layers satisfy:

$$R_1 = R_2 \times (1-R_1) = R_3 \times (1-R_2) \times (1-R_1) = \ldots = R_n \times (1-R_{n-1}) \times (1-R_{n-2}) \times \ldots \times (1-R_1).$$

Figure 5:
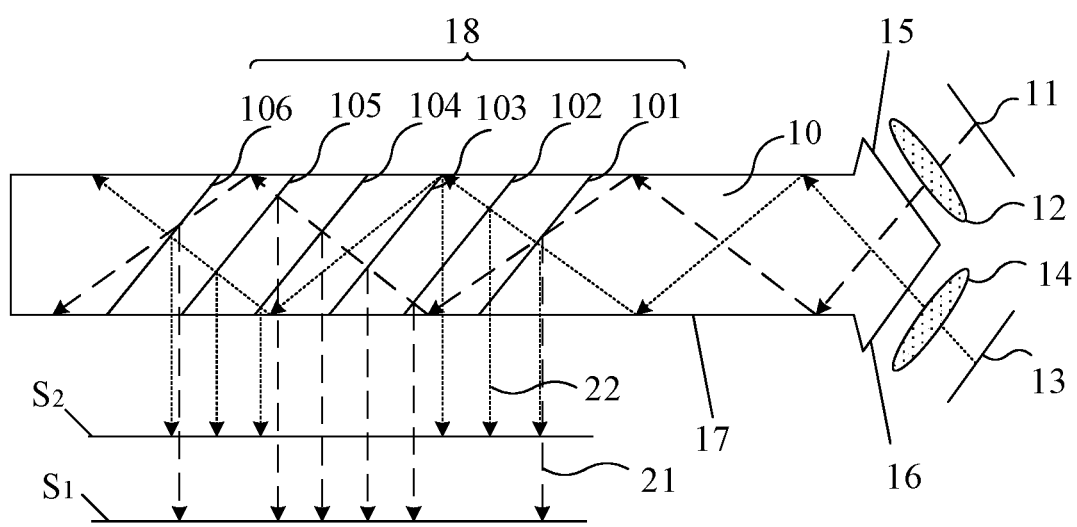
FIG. 5 is a fourth cross-sectional view of a near-to-eye display device according to some embodiments of the disclosure.

FIG. 5 is a fourth cross-sectional view of a near-to-eye display device according to some embodiments of the disclosure.

Referring to FIG. 5, in the embodiment of the disclosure, the light taking part 18 includes six transflective layers: the first transflective layer 101, a second transflective layer 102, a third transflective layer 103, a fourth transflective layer 104, a fifth transflective layer 105 and a sixth transflective layer 106, the reflectivity corresponding to the six transflective layers is $R_1$, $R_2$, $R_3$, $R_4$, $R_5$ and $R_6$ respectively, and the reflectivities of the respective transflective layers satisfy:

$$R_1 = R_2 \times (1-R_1) = R_3 \times (1-R_2) \times (1-R_1) = R_4 \times (1-R_3) \times (1-R_2) \times (1-R_1) = R_5 \times (1-R_4) \times (1-R_3) \times (1-R_2) \times (1-R_1)$$
$$= R_6 \times (1-R_5) \times (1-R_4) \times (1-R_3) \times (1-R_2) \times (1-R_1).$$

Through the above arrangement, the reflected light rays emitted towards the light-emitting surface 17 may be uniformly distributed, so that the emitted light rays entering the human eyes are uniformly distributed.

In the embodiment of the disclosure, the first display screen 11 and the second display screen 13 is one of a liquid crystal display, a light-emitting diode display, an organic light-emitting diode display, and a micro-organic light-emitting diode display, which is not limited herein.

The liquid crystal display (LCD) is mainly composed of a backlight module and a liquid crystal display panel. The liquid crystal display panel does not emit light, and brightness display needs to be realized by means of a light source provided by the backlight module. An imaging principle of the LCD is that liquid crystal is placed between two pieces of conductive glass and is driven by an electric field between two electrodes to cause an electric field effect of liquid crystal molecule distortion so as to control a transmission or shielding function of a backlight source and display images. If a color filter is added, a color image may be displayed. The liquid crystal display technology is mature, and the LCD has low cost and excellent performance.

The light-emitting diode (LED) display is a kind of display screen composed of an LED array, LEDs are adopted as display sub-pixels, and image display may be realized by controlling display brightness of each LED. The LED display has the characteristics of high brightness, small power consumption, low voltage requirement, small and convenient equipment and the like. By adopting the LED display as one display screen 1 in the near-to-eye display device, miniaturization of the near-to-eye display device is facilitated.

The organic light-emitting diode (OLED) display is also known as an organic electroluminescence display and an organic light-emitting semiconductor display. The OLED display belongs to current type organic light-emitting components, which emits light through injection and recombination of carriers, and a luminous intensity is proportional to the injected current. Under the action of an electric field, holes generated by an anode and electrons generated by a cathode will move to be respectively injected into a hole transport layer and an electron transport layer, and then migrate to a light-emitting layer. When the holes and the electrons meet at the light-emitting layer, energetic excitons are generated, thereby exciting light-emitting molecules to ultimately produce visible light. The OLED display is a self-luminous display screen, so that a backlight module is not required, an overall thickness of the component is small, miniaturization of the near-to-eye display device is achieved, and installation of the whole apparatus is facilitated.

The micro-organic light-emitting diode display miniaturizes a light-emitting unit of an organic light-emitting diode, so that more pixels may be disposed in a limited size, and a resolution ratio of the display screen is improved.

In the embodiment of the disclosure, the first imaging lens 12 includes at least one lens; and the second imaging lens 14 includes at least one lens. The lens in the first imaging lens 12 is one of a spherical lens, an aspherical lens or a free-form lens; and the lens in the second imaging lens 14 is one of a spherical lens, an aspherical lens or a free-form lens.

In some embodiments, the first imaging lens 12 and the second imaging lens 14 each may be one lens to simplify a structure; or, more than three lenses to optimize the imaging quality. The embodiment of the disclosure is exemplified only by taking each imaging lens including one lens as an example, and the number of lenses in each imaging lens is not specifically limited. The type of the lens in each imaging lens needs to be designed according to the actual situation, which is not limited herein.

The lens in each imaging lens may be the spherical lens, the aspherical lens or the free-form lens. The spherical lens has the advantages of simple design, low assembly precision requirement and the like. Thicknesses of the aspherical lens and the free-form lens are relatively small, so that the image quality may be optimized, and selection is made according to actual requirements in optical design.

The lenses in the first imaging lens 12 and the second imaging lens 14 may be made of one of glass or plastic, which is not limited herein.

In some embodiments of the disclosure, the waveguide 10 is made of glass. The refractive index is about 1.5, which is larger than that of air. When the imaging light rays are guided in the waveguide 10, the condition under which the light rays are conducted from an optically denser medium to an optically thinner medium is formed, so that the imaging light rays may be totally reflected in the waveguide 10, and the conduction of the imaging light rays in the waveguide 10 is facilitated.

The near-to-eye display device provided by the disclosure, includes: the first display screen configured to display the first image, the second display screen configured to display the second image, the first imaging lens located at the light-emitting side of the first display screen and configured to image the first image, and the second imaging lens located at the light-emitting side of the second display screen and configured to image the second image. The image distances of the first imaging lens and the second imaging lens are different. The waveguide is located on the optical paths of the first imaging lens and the second imaging lens and configured to guide the imaging light rays of the first imaging lens and the second imaging lens. The waveguide includes the first light incident surface, the second light incident surface, the light-emitting surface and the light taking part located in the waveguide. The first light incident surface is configured to receive the imaging light ray of the first imaging lens. The second light incident surface is configured to receive the imaging light ray of the second imaging lens. The light taking part is configured to reflect the imaging light rays conducted in the waveguide towards the light-emitting surface. The light-emitting surface is configured to emit the imaging light rays towards the direction of the human eyes. Due to the fact that the image distances of the first imaging lens and the second imaging lens are different, the display images of the first display screen and the second display screen are allowed to be imaged on two different image planes, and two different images may be observed. Through eye adjustment, the image of the second image plane is blurry when the image of the first image plane is observed, and the image of the first image plane is blurry when the image of the second image plane is observed. Such experience is consistent with the feeling that the human eyes observe the actual scene, so the dizziness phenomenon caused by brain fatigue due to long-time watching may be avoided.

Although the preferred embodiments of the disclosure have been described, those skilled in the art can make additional changes and modifications on these embodiments once they know the basic creative concept. So the appended claims are intended to be construed to include the preferred embodiments and all changes and modifications that fall into the scope of the disclosure.

Apparently, those skilled in the art can make various modifications and variations to the disclosure without departing from the spirit and scope of the disclosure. In this way, under the condition that these modifications and variations of the disclosure fall within the scope of the claims of the disclosure and their equivalent technologies, the disclosure is also intended to include these modifications and variations.

What is claimed is:

1. A near-to-eye display device, comprising:
a first display screen, configured to display a first image;
a second display screen, configured to display a second image;
a first imaging lens, located at a light-emitting side of the first display screen and configured to image the first image;
a second imaging lens, located at a light-emitting side of the second display screen and configured to image the second image; wherein
image distances of the first imaging lens and the second imaging lens are different; and
a waveguide, located on optical paths of the first imaging lens and the second imaging lens and configured to guide imaging light rays through the first imaging lens and imaging light rays through the second imaging lens; wherein the waveguide comprises:
a first light incident surface;
a second light incident surface;
a light-emitting surface; and
a light taking part in the waveguide;
wherein
the first light incident surface is configured to receive the imaging light rays through the first imaging lens;
the second light incident surface is configured to receive the imaging light rays through the second imaging lens;
the light taking part is configured to reflect the imaging light rays guided in the waveguide towards the light-emitting surface; and
the light-emitting surface is configured to allow the imaging light rays to go towards human eyes.

2. The near-to-eye display device according to claim 1, wherein a distance between the first imaging lens and the first display screen is same as a distance between the second imaging lens and the second display screen, and a focal length of the first imaging lens is different from a focal length of the second imaging lens.

3. The near-to-eye display device according to claim 1, wherein a focal length of the first imaging lens is same as a focal length of the second imaging lens, and a distance between the first imaging lens and the first display screen and a distance between the second imaging lens and the second display screen are different.

4. The near-to-eye display device according to claim 2, wherein the distance between the first imaging lens and the first display screen is less than the focal length of the first imaging lens; and the distance between the second imaging lens and the second display screen is less than the focal length of the second imaging lens.

5. The near-to-eye display device according to claim 1, wherein the waveguide further comprises a back surface disposed opposite to the light-emitting surface;
the first light incident surface is located at an end of the back surface and forms a first included angle with the back surface;
the second light incident surface is located at an end of the light-emitting surface and forms a second included angle with the light-emitting surface; and
the first light incident surface and the second light incident surface are in mirror symmetry with respect to a symmetry surface of the waveguide, and the symmetry surface is located in a middle of the light-emitting surface and the back surface and is parallel to the light-emitting surface and the back surface.

6. The near-to-eye display device according to claim 5, wherein the first included angle is 40°-60°, and the second included angle is 40°-60°.

7. The near-to-eye display device according to claim 5, wherein the light taking part comprises a transflective layer, and the transflective layer is disposed between the light-emitting surface and the back surface and forms a third included angle with the light-emitting surface; and
the transflective layer is configured to allow a part of the imaging light rays to pass through the transflective layer, and reflect a part of the imaging light rays towards the light-emitting surface.

8. The near-to-eye display device according to claim 7, wherein the light taking part comprises a plurality of transflective layers, and the plurality of transflective layers are parallel and distributed at equal intervals.

9. The near-to-eye display device according to claim 8, wherein a quantity of the transflective layers is 2-10.

10. The near-to-eye display device according to claim 8, wherein reflectivity of the transflective layers increases along with increase of a distance between the plurality of transflective layers and the first light incident surface; and
the reflectivity of the transflective layers sequentially is indicated as $R_1$ to $R_n$ in a direction of increase of the distance between the transflective layers and the first light incident surface, and the respective reflectivities of the plurality of transflective layers satisfy a following condition:

$$R_1 = R_2 \times (1-R_1) = R_3 \times (1-R_2) \times (1-R_1) = \ldots = R_n \times (1-R_{n-1}) \times (1-R_{n-2}) \times \ldots \times (1-R_1).$$

11. The near-to-eye display device according to claim 10, wherein the light taking part comprises six transflective layers, and the six reflectivities of the plurality of transflective layers satisfy a following condition:

$$R_1 = R_2 \times (1-R_1) = R_3 \times (1-R_2) \times (1-R_1) = R_4 \times (1-R_3) \times (1-R_2) \times (1-R_1) = R_5 \times (1-R_4) \times (1-R_3) \times (1-R_2) \times (1-R_1) = R_6 \times (1-R_5) \times (1-R_4) \times (1-R_3) \times (1-R_2) \times (1-R_1).$$

12. The near-to-eye display device according to claim 7, wherein the third included angle is 20°-30°.

13. The near-to-eye display device according to claim 1, wherein the first display screen and the second display screen is one of a liquid crystal display, an organic light-emitting diode display, a micro-organic light-emitting diode display and a light-emitting diode display.

14. The near-to-eye display device according to claim 1, wherein the first imaging lens comprises at least one lens, and the second imaging lens comprises at least one lens.

15. The near-to-eye display device according to claim 14, wherein the at least one lens in the first imaging lens is one of a spherical lens, an aspherical lens or a free-form lens; and the at least one lens in the second imaging lens is one of a spherical lens, an aspherical lens or a free-form lens.

16. The near-to-eye display device according to claim 1, wherein the waveguide is made of glass.

* * * * *